United States Patent Office 2,705,726
Patented Apr. 5, 1955

2,705,726

IODINATED AMINOPHENYL-CARBOXYLIC ACIDS

Sydney Archer, Albany, N. Y., assignor to Sterling Drug Inc., New York, N. Y., a corporation of Delaware No Drawing. Application July 23, 1949,
Serial No. 106,509

14 Claims. (Cl. 260—518)

This invention relates to halogenated amino-phenyl derivatives of saturated carboxylic acids and to salts thereof and to processes for preparing the same. In particular this invention relates to iodo-amino-phenyl derivatives of saturated aliphatic carboxylic acids.

These compounds are opaque to X-rays and are valuable as contrast media in roentgenological examinations of the gall bladder. They are definite and stable compounds of recognized chemical properties, the halogen being firmly attached to the phenyl radical. The amino group appears to be particularly effective in causing ready absorption of the compound after oral administration and rapid concentration in the gall bladder, as well as rapid and facile elimination from the body.

My new compounds have the formula

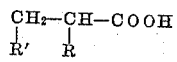

where one of R and R' is a hydrocarbon radical having from 2 to 8 carbon atoms and the other of R and R' is an aminophenyl radical further substituted by at least two but no more than three iodine atoms distributed among the positions ortho and para to the amino group. The salts of these acids formed from inorganic or organic bases are also within the scope of my invention.

The hydrocarbon radical may include groups such as alkyl; aralkyl, including benzyl, phenylethyl, p-tolylmethyl, etc.; cycloalkyl, including cyclopentyl, cyclohexyl, etc.; alkylcycloalkyl, including methylcyclophenyl, dimethylcyclopentyl, methylcyclohexyl, dimethylcyclohexyl, etc.; cycloalkylalkyl, including cyclopentylethyl, cyclohexylmethyl, cyclohexylethyl, etc.; aryl, including phenyl, p-tolyl, o-tolyl, p-ethylphenyl, etc.; alkenyl, including vinyl, allyl, pentenyl, hexenyl, etc.; and cycloalkenyl, including cyclohexenyl, cyclopentenyl, etc.

Examples of compounds within the scope of my invention include the following: alpha-ethyl-beta-(3,5-diiodo-4-aminophenyl)-propionic acid; alpha-(3,5-diiodo-2-aminophenyl)-beta-propylpropionic acid; alpha-butyl-beta-(4,6-diiodo-3-aminophenyl)-propionic acid; alpha-amyl-beta-(2,4,6-triiodo-3-aminophenyl)-propionic acid; alpha-hexyl-beta-(3,5-diiodo-4-aminophenyl)-propionic acid; alpha-(3,5-diiodo-2-aminophenyl)-beta-heptylpropionic acid; alpha-octyl-beta-(4,6-diiodo-3-aminophenyl)-propionic acid; alpha-benzyl-beta-(3,5-diiodo-4-aminophenyl)-propionic acid; alpha-(2'-phenylethyl)-beta-(3,5-diiodo-4-aminophenyl)-propionic acid; alpha-(3,5-diiodo-4-aminophenyl)-beta-(p-tolylmethyl)-propionic acid; alpha-cyclopentyl-beta-(3,5 - diiodo - 4 - aminophenyl)-propionic acid; alpha-(4,6-diiodo-3-aminophenyl)-beta-cyclohexylpropionic acid; alpha-(3'-methylcyclopentyl)-beta-(3,5-diiodo-4-aminophenyl)-propionic acid; alpha-(2',3'-dimethylcyclopentyl)-beta-(3,5-diiodo - 4 - aminophenyl)-propionic acid; alpha - (4' - methylcyclohexyl)-beta-(3,5-diiodo-4-aminophenyl)-propionic acid; alpha-(3',4'-dimethylcyclohexyl)-beta-(3,5-diiodo - 4 - aminophenyl)-propionic acid; alpha-(2'-cyclopentylethyl)-beta-(3,5-diiodo-4-aminophenyl)-propionic acid; alpha-cyclohexylmethyl-beta-(3,5-diiodo-4-aminophenyl) - propionic acid; alpha - (2' - cyclohexylethyl)-beta-(3,5-diiodo-4-aminophenyl)-propionic acid; alpha-phenyl-beta-(3,5-diiodo-4-aminophenyl)-propionic acid; alpha-(p-tolyl)-beta-(3,5-diiodo-4-aminophenyl)-propionic acid; alpha-(o-tolyl)-beta-(3,5-diiodo - 4 - aminophenyl) - propionic acid; alpha - (p-ethylphenyl)-beta-(3,5-diiodo-4-aminophenyl)-propionic acid; alpha-vinyl-beta-(3,5-diiodo-4-aminophenyl)-propionic acid; alpha-allyl - beta - (3,5-diiodo- 4 - aminophenyl) - propionic acid; alpha-(3'-pentenyl)-beta-(3,5-diiodo - 4 - aminophenyl)-propionic acid; alpha-(4'-hexenyl)-beta-(3,5 - diiodo - 4 - aminophenyl)-propionic acid; alpha-($\Delta^1$-cyclohexenyl)-beta-(3,5-diiodo-4-aminophenyl)-propionic acid; alpha-($\Delta^2$-cyclopentenyl) - beta - (3,5-diiodo-4-aminophenyl)-propionic acid.

Those compounds of the above type which contain less than about 10 carbon atoms are useless as contrast agents for cholecystography (gall bladder visualization) because they are excreted through the kidneys rather than concentrated in the bile. On the other hand when the compound contains more than about 18 carbon atoms, the molecule becomes too insoluble and is poorly absorbed from the intestinal tract. It appears that the molecule must be sufficient size to impart fat-solubility to the compound in order that it may be used for visualizing the gall bladder, but the molecule must not be too large if the compound is to be absorbed readily. In short, the compound must resemble the bile salts in solubility.

The contrast agents which have been widely used up to the present time for cholecystography are not completely satisfactory. Tetraiodophenolphthalein frequently causes violent physiological reactions. 2-(4'-hydroxy-3',5'-diiodophenyl)-quinoline-4-carboxylic acid is much too toxic. Beta-(4-hydroxy-3,5-diiodophenyl)-alpha-phenylpropionic acid is better than the others but occasionally produces pain on urination, interferes with the rate of emptying of the gall bladder following a fatty meal, causes a burning sensation in the throat, or produces nausea, vomiting and diarrhea.

The compounds of my invention have been shown to be particularly advantageous in a number of ways. They are easily administered, e. g., orally. They are readily absorbed and concentrated in the gall bladder and yet are readily eliminated after use. They are relatively non-toxic and are tolerated in other ways by the subject.

My compounds have an oral toxicity of the same order of magnitude as that of beta-(4-hydroxy-3,5-diiodophenyl)-alpha-phenylpropionic acid and produce cholecystographic pictures of an intensity at least equal to equivalent doses of the hydroxy compound. Extensive experimentation using beta-(4-amino-3,5-diiodophenyl)-alpha-phenylpropionic acid and its sodium salt has shown that this compound produces no incidence of nausea and vomiting in dogs, cats or humans, no burning upon micturition in humans, and does not appreciably delay the time of emptying of the gall bladder following a fatty meal. Thus the serious objections to the corresponding hydroxy compound, mentioned above, have been largely overcome.

In preparing acids of the type

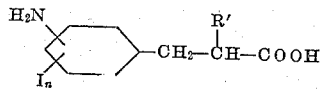

where R' is a hydrocarbon radical of 2 to 8 carbon atoms and $n$ is 2 or 3, I have found the following sequence of reactions satisfactory.

A. A nitrobenzaldehyde is subjected to the Perkin condensation to form an alpha substituted cinnamic acid. This is done by heating the nitrobenzaldehyde with the anhydride of an acid, in the presence of a base, preferably the sodium or potassium salt of said acid. The alpha substituted nitrocinnamic acid is formed in 70–85% yield. Various modifications of this reaction may be employed in some instances. Sometimes the anhydride and salt used are derived from different acids; for example, a mixture of benzaldehyde, acetic anhydride and sodium phenylacetate gives alpha-phenylcinnamic acid. In Example 6 of this specification, a mixture of benzaldehyde, sodium acetate, acetic anhydride and p-nitrophenylacetic acid produces alpha-(p-nitrophenyl)-cinnamic acid. If a benzaldiacetate is used instead of the aldehyde, an acid anhydride is not necessary; for example, a mixture of p-nitrobenzaldiacetate, acetic acid, sodium acetate and sodium phenylacetate gives a good yield of p-nitro-alpha-phenylcinnamic acid.

Any one of the three isomeric nitrobenzaldehydes may be used as the carbonyl component. Examples of acid components include phenylacetic acid, cyclohexylacetic acid, butyric acid and caproic acid.

B. Catalytic reduction of the nitro group to an amino group and the double bond of the cinnamic acid side chain to form an alpha substituted aminohydrocinnamic acid in 70–85% yield. The product may be isolated either as the free amino acid or as the amino acid hydrochloride, but preferably as the latter. The preferred catalyst for reduction is Raney nickel, however others such as platinum or palladium may be used.

C. Iodination, in which two or three iodine atoms are introduced into available positions, ortho or ortho and para to the amino group, as by the action of iodine monochloride in acetic or hydrochloric acid solution, producing the compounds to be used as contrast media in 60–75% yield. Instead of using iodine monochloride in acidic solution, elementary iodine can also be used as the iodinating agent.

Compounds of the type

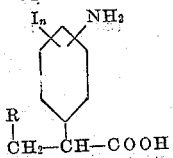

where R is phenyl can be prepared by the above series of reactions starting with a Perkin condensation using benzaldehyde, acetic anhydride and the sodium salt of a nitrophenylacetic acid (or its equivalent). If R is a hydrocarbon radical of 2 to 8 carbon atoms other than phenyl (or aryl) other methods of approach must be used. Benzyl cyanide can be alkylated with RCH₂X, where X is a halogen atom in the presence of sodium amide, sodium hydride or some other basic catalyst to give an alpha-phenyl-beta-substituted propionitrile. The aromatic ring may then be nitrated mainly in the para position and the nitrile group hydrolyzed to a carboxyl group. The succeeding steps are similar to those described for reduction of the nitro group to an amino group and iodination. If the amino group in the benzene ring is desired in the ortho or meta position, it is necessary to have the nitro groups present before the alkylation steps; the starting materials are o-nitrobenzyl cyanide and m-nitrobenzyl cyanide.

The following examples will further illustrate my invention and demonstrate the generality of the reactions involved, without, however, limiting the scope of the invention thereto.

Example 1

(a) *p-Nitro-alpha-phenylcinnamic acid.*—A mixture of 560 g. of p-nitrobenzaldiacetate (prepared in 60% yield from p-nitrotoluene, Org. Synth., Coll. vol. II, p. 441), 340 g. of phenylacetic acid, 228 g. of fused sodium acetate, and 560 cc. of glacial acetic acid is refluxed for fifteen hours. The reaction mixture is slowly diluted with 3 liters of water at 40° C. whereupon crystallization begins. After cooling to 5° C., the product is filtered, washed with water, dissolved in 4 liters of water containing 80 g. of sodium hydroxide and filtered through infusorial earth to remove alkali-insoluble material. The alkaline filtrate is acidified with 120 cc. of glacial acetic acid and the precipitated acid filtered, washed with hot water and dried at 75° C., giving about 425 g. of p-nitro-alpha-phenylcinnamic acid, M. P. 190–205° C. (a mixture of the cis and trans isomers). An additional 50 g. of product may be obtained by further acidification of the filtrate with hydrochloric acid until acid to Congo red; total yield about 85%.

(b) *p-Amino-alpha-phenylhydrocinnamic acid.*—The total product from the above process is dissolved in 1 liter of water containing 74 g. of sodium hydroxide. Raney nickel catalyst (4 tablespoons) is added, and the mixture shaken at 70° C. in an atmosphere of hydrogen at 1000 lbs. per sq. in. initial pressure. The calculated amount of hydrogen is absorbed in three to six hours, and the reaction mixture is then filtered to remove the catalyst and acidified with 450 cc. of concentrated hydrochloric acid. The hydrochloric of p-amino-alpha-phenylhydrocinnamic acid precipitates and is filtered and washed with cold concentrated hydrochloric acid diluted with one volume of water, giving about 415 g. (85%) of dried product. The free amino acid derived from this salt melts at 204–207° C. Neutralization of the filtrate from the hydrochloride gives about 30 g. additional impure amino acid.

(c) *Beta-(4 - amino - 3,5-diiodophenyl) - alpha-phenylpropionic acid.*—p-Amino - alpha - phenylhydrocinnamic acid hydrochloride (765 g., prepared as in part b), 6750 cc. of glacial acetic acid and 5850 cc. of water are heated on a water bath in a 22 liter flask equipped with a stirrer, thermometer, reflux condenser and dropping funnel. A solution of 360 cc. of iodine monochloride in 1080 cc. of glacial acetic acid is then added through the dropping funnel over a period of two hours, while maintaining the reaction mixture at a temperature of 74–79° C. Solid material begins to separate after the addition is about 75% complete. After all the iodine monochloride has been added, stirring is continued for one hour at 75–80° C., the mixture is cooled to 50–60° C., and sulfur dioxide is bubbled through for one hour. Further cooling to 35° C. is allowed, and then 9 liters of water containing sulfur dioxide is added. Crystallization is completed by cooling the mixture to 0° C., and then the product is filtered and washed with cold water. The red-brown solid is dissolved in 5.4 liters of boiling methanol containing activated charcoal and 450 cc. of water saturated with sulfur dioxide, filtered hot, and the charcoal cake stirred with 1350 cc. of boiling methanol, filtered and washed with more methanol. All of the methanol filtrates and washings are combined, and 4.5 liters of water containing sulfur dioxide is added at 35° C. Beta-(4-amino-3,5-diiodophenyl)-alpha-phenylpropionic acid crystallizes and is filtered and washed with 900 cc. of cold water and 900 cc. of low boiling petroleum ether, giving about 1075 g. (74%), M. P. 169–170° C.

(d) *Morpholine salt of beta-(4-amino-3,5-diiodophenyl)-alpha-phenylpropionic acid.*—A solution of 10 g. of morpholine in 50 cc. of acetone is added dropwise over a period of fifteen minutes to a stirred solution of 49.3 g. of beta-(4-amino-3,5-diiodophenyl)-alpha-phenylpropionic acid in 1000 cc. of acetone. The morpholine salt precipitates and is filtered and washed with 300 cc. of acetone; yield about 56 g. Recrystallization from 50% ethanol gives a colorless product with the M. P. 179–183° C. with previous softening at 163° C. The free amino acid may be regenerated by treatment of an aqueous alcoholic solution of the morpholine salt with acid. This is a convenient and efficient method of purifying the amino acid and may be applied to related compounds within the scope of the invention.

(e) *Sodium salt of beta-(4-amino-3,5-diiodophenyl)-alpha-phenylpropionic acid.*—The free amino acid (49.3 g.) is added to a solution of 2.30 g. of sodium in 250 cc. of absolute ethanol. The resulting solution is concentrated to dryness, and the solid residue is covered with toluene and the toluene then evaporated. The sodium salt is dried at 100° C. for 20 hrs.; yield about 50 g.

Example 2

(a) *Alpha-ethyl-p-nitrocinnamic acid.*—A mixture of 84.9 g. of p-nitrobenzaldehyde, M. P. 103–105° C., 266 g. of butyric anhydride and 618 g. of sodium butyrate is heated to 120° C. for five hours. The reaction mixture is then poured into 1 liter of water and steam distilled to remove excess butyric anhydride and butyric acid. The oily solid remaining is filtered, washed with low boiling petroleum ether and recrystallized from dilute ethanol, giving about 74 g. of alpha-ethyl-p-nitrocinnamic acid, M. P. 168–169° C.

(b) *p-Amino-alpha-ethylhydrocinnamic acid.*—A mixture of 638 g. of alpha-ethyl-p-nitrocinnamic acid, 85 g. of sodium hydroxide in 600 cc. of water, and 5 teaspoons of Raney nickel catalyst is heated at 70° C. in an atmosphere of hydrogen at an initial pressure of 1000 lbs. per sq. in. until the calculated amount of hydrogen is absorbed. The filtered solution is acidified with hydrochloric acid, and then brought to pH 6–7 with 2 N sodium hydroxide to precipitate the solid amino acid, yield about 58 g., M. P. 128–130° C.

(c) *Beta-(4- amino-3,5-diiodophenyl)-alpha-ethylpropionic acid.*—A solution of 50 g. of p-amino-alpha-ethylhydrocinnamic acid in 250 cc. of glacial acetic acid and 50 cc. of water is heated to 65–70° C., and a solution of 30 cc. (96 g.) of iodine monochloride in 100 cc. of glacial acetic acid is added in portions over a period of 45 minutes, followed by 50 cc. of water. After these additions, the solution is stirred and the temperature held at 65–75° C. for one and one-quarter hours longer. Water (100 cc.) is added, and the mixture is cooled to 50° C. and combined with 1.5 liters of water saturated with sulfur dioxide. The oily product solidifies and is filtered. Two recrystallizations from dilute methanol using charcoal and sulfur dioxide as decolorizing agents gives the desired product, beta-(4-amino-3,5-diiodophenyl)-alpha-ethylpropionic acid, M. P. 113–114° C.; yield about 30 g.

(d) A solution of 87.4 g. of iodine monochloride in 150 ml. of 8 N hydrochloric acid and 300 ml. of chloroform is stirred and warmed to maintain a gentle reflux. A solution of beta-(p-aminophenyl)-alpha-ethylpropionic acid in dilute hydrochloric acid prepared by acidifying the reduction mixture from 50 g. of alpha-ethyl-p-nitrocinnamic acid is added over a forty-minute period. After refluxing for forty minutes more, the two-phase system is cooled and the layers separated. The aqueous portion is washed with chloroform. The combined organic layers are washed with two 150 ml. portions of water, two 120 ml. portions of 5% aqueous sodium hydrosulfite and again with water. The chloroform solution is dried by diluting with petroleum ether. On standing, about 66.5 g. of the crude diiodo acid separates. After recrystallization from dilute methanol with the aid of decolorizing charcoal, there is obtained about 58.7 g. of pure beta-(4-amino-3,5-diiodophenyl)-alpha-ethylpropionic acid, M. P. 114–115° C.

The morpholine salt of beta-(4-amino-3,5-diiodophenyl)-alpha-ethylpropionic acid has the M. P. about 130–132° C.

Example 3

(a) *m-Nitro-alpha-phenylcinnamic acid.*—The condensation of 120 g. of m-nitrobenzaldehyde, 138 g. of sodium phenylacetate in the presence of 350 cc. of acetic anhydride is carried out in the general manner described in Example 2, part (a). The m-nitro-alpha-phenylcinnamic acid so obtained crystallizes brom dilute ethanol; M. P. 160–173° C.; yield about 170 g. This product is a mixture of cis and trans isomers.

(b) *m-Amino-alpha-phenylhydrocinnamic acid* is prepared by reduction of the nitrocinnamic acid in a manner analogous to Example 2, part (b). The m-amino-alpha-phenylhydrocinnamic acid obtained crystallizes from ethanol and has the M. P. 131–133° C.

(c) *Beta-(3-amino-4,6-diiodophenyl)-alpha-phenylpropionic acid.*—The iodination of m-amino-alpha-phenylhydrocinnamic acid is carried out in a manner similar to that used in Example 2, part (c). The beta-(3-amino-4,6-diiodophenyl)-alpha-phenylpropionic acid so prepared crystallizes from dilute alcohol and has the M. P. 205–205.5° C.

Example 4

(a) *Alpha-butyl-p-nitrocinnamic acid* is prepared from 123.5 g. of p-nitrobenzaldehyde, 113 g. of sodium caproate and 350 g. of caproic anhydride in a manner similar to that used in Example 2, part (a). The crude alpha-butyl-p-nitrocinnamic acid crystallizes from ethanol giving about 90 g., M. P. 152–158° C. Further purification gives one of the pure isomers with the M. P. 162–163° C.

(b) *p-Amino-alpha-butylhydrocinnamic acid.*—Alpha-butyl-p-nitrocinnamic acid (90 g.) is reduced in a manner analogous to Example 2, part (b), giving about 63 g. of p-amino-alpha-butylhydrocinnamic acid, M. P. 148–151° C. A pure sample, obtained by recrystallization from ethanol melts at 151.5–152° C.

(c) *Beta-(p-amino-3,5-diiodophenyl)-alpha-butylpropionic acid.*—A solution of 28 g. of p-amino-alpha-butylhydrocinnamic acid, prepared in part (b), in 1 liter of water containing 125 cc. of concentrated hydrochloric acid is warmed to 50–60° C. and 14 cc. (44.5 g.) of iodine monochloride added in small portions over a period of fifteen minutes. The reaction mixture is heated with stirring for two and one-half hours longer, cooled and diluted to precipitate the product. The solid is filtered and dissolved in 100 cc. of methanol, water added until a permanent cloudiness appears, and the solution decolorized with sodium hydrosulfite and activated charcoal. In this way, 40 g. of beta-(p-amino-3,5-diiodophenyl)-alpha-butylpropionic acid is obtained with the M. P. 106–107.5° C. A pure sample is obtained by recrystallization from chloroform-petroleum ether and has the M. P. 109–110° C.

Example 5

(a) *Alpha-cyclohexyl-p-nitrocinnamic acid.*—A mixture of 100 g. of p-nitrobenzaldehyde, 353 g. of cyclohexylacetic anhydride and 108 g. of sodium cyclohexylacetate is heated at 135° C. for six hours, and for one hour at 135–145° C. The reaction mixture is poured into 2 liters of water containing 60 g. of sodium hydroxide and heated on the steam bath, more sodium hydroxide being added to retain alkalinity. After cooling and extracting neutral material with ether, the alkaline solution is acidified with hydrochloric acid and extracted with ether. The ether extracts are concentrated and the residue poured into 1 liter of low boiling petroleum ether. The product crystallizes and is filtered and recrystallized from dilute ethanol giving about 48 g. of alpha-cyclohexyl-p-nitrocinnamic acid, M. P. 181–183° C.

(b) *p-Amino-alpha-cyclohexylhydrocinnamic acid.*—A mixture of 44.5 g. of alpha-cyclohexyl-p-nitrocinnamic acid, dissolved in a solution of 6.5 g. of sodium hydroxide in 700 cc. of water, and 5 teaspoons of Raney nickel catalyst is heated to 70° C. in an atmosphere of hydrogen at an initial pressure of 300 lbs. per sq. in. Reduction is complete in two hours. The filtered solution is acidified with hydrochloric acid and cooled, whereupon the hydrochloride of p-amino-alpha-cyclohexylhydrocinnamic acid precipitates.

(c) *Beta-(4-amino-3,5-diiodophenyl)-alpha-cyclohexylpropionic acid.*—A solution of 10 g. of p-amino-alpha-cyclohexylhydrocinnamic acid hydrochloride in 500 cc. of water containing 70 cc. of concentrated hydrochloric acid is warmed and added gradually to a stirred solution of 8 g. of iodine monochloride dissolved in 50 cc. of water and 50 cc. of concentrated hydrochloric acid held at 70° C. After the addition is completed, the reaction mixture is heated and stirred for one hour longer, then cooled and decolorized by bubbling sulfur dioxide through it. The precipitated product is filtered and recrystallized from dilute ethanol using sodium bisulfite to aid in removing colored impurities. The beta-(4-amino-3,5-diiodophenyl)-alpha-cyclohexylpropionic acid melts at 172–174° C.

Instead of using a mixture of cyclohexylacetic anhydride and sodium cyclohexylacetate in part (a) of the above procedure, there may be used one of the following mixtures: capric anhydride and sodium caprate; beta-phenyl-propionic anhydride and sodium beta-phenylpropionate; or gamma-cyclohexylbutyric anhydride and sodium gamma-cyclohexylbutyrate. Then the products obtained after reduction of the nitro group and iodination are respectively: beta-(4-amino-3,5-diiodophenyl)-alpha-octylpropionic acid, beta-(4-amino-3,5-diiodophenyl)-alpha-benzylpropionic acid, and beta-(4-amino-3,5-diiodophenyl)-alpha-(2-cyclohexylethyl)-propionic acid.

Example 6

(a) *Alpha-(4-nitrophenyl)-cinnamic acid.*—A mixture of 58.0 g. of benzaldehyde, 58.0 g. of fused sodium acetate, 83.5 g. of p-nitrophenylacetic acid and 250 cc. of acetic anhydride is refluxed for ten hours. Then 500 cc. of water is added and the precipitated product filtered and treated with 500 cc. of 1 N sodium hydroxide solution. Alkali insoluble material is filtered off and washed with dilute sodium hydroxide. Acidification of the filtrate and washings gives crystalline material which upon recrystallization can be separated into the two isomers of alpha-(4-nitrophenyl)-cinnamic acid. From methanol is obtained about 39 g. of one isomer, M. P. 223–224° C., and from a chloroform-petroleum ether mixture about 8 g. of the other isomer, M. P. 150–152° C.

(b) *Alpha-(4-aminophenyl)-hydrocinnamic acid* is prepared by reduction of the higher melting isomer of the nitrocinnamic acid in a manner analogous to Example 2, part (b). The amino acid has the M. P. 202–204° C.

(c) *Alpha-(4-amino-3,5-diiodo)-beta-phenylpropionic acid.*—A solution of 25.2 g. of the hydrocinnamic acid as prepared in part (b) above, in 5 liters of water containing 600 cc. of concentrated hydrochloric acid is warmed to 65° C., and 22.7 cc. (72.3 g.) of iodine monochloride is added in small portions over a period of fifteen minutes.

Then the reaction mixture is heated with stirring for two and one-half hours longer, cooled to 35° C., and sulfur dioxide is bubbled through to decolorize. The precipitated product is filtered, dried and recrystallized from dilute ethanol two or three times, using activated charcoal and sulfur dioxide to aid in removing colored impurities. About 18 g. of alpha-(4-amino-3,5-diiodo)-beta-phenylpropionic acid is obtained with the M. P. 145–146.5° C.

Example 7

(a) *Alpha-ethyl-m-nitrocinnamic acid* is prepared from 100 g. of m-nitrobenzaldehyde, 210 g. of butyric anhydride and 73 g. of sodium butyrate in the manner described in Example 2, part (a). The crude alpha-ethyl-m-nitrocinnamic acid is crystallized from ethanol giving about 105 g., M. P. 140–142° C. From the filtrates there may be isolated a small amount of a stereo-isomer, which when pure melts at 105–106° C.

(b) *m-Amino-alpha-ethylhydrocinnamic acid.*—A mixture of 50 g. of alpha-ethyl-m-nitrocinnamic acid, 9.1 g. of sodium hydroxide, 600 cc. of water and 5 teaspoons of Raney nickel catalyst is shaken at 32° C. in an atmosphere of hydrogen at an initial pressure of 450 lbs. per sq. in. until the calculated amount of hydrogen is absorbed. The filtered solution is acidified with hydrochloric acid, made basic with ammonium hydroxide and again acid with acetic acid. Upon concentration of this solution, an oil separates which crystallizes upon standing, giving about 20 g., M. P. 60–68° C. Complete evaporation of the filtrate and extraction of the residue of inorganic salts with ether gives about 20 g. of additional material, M. P. 54–59° C. Recrystallization of the combined product from benzene-petroleum ether gives about 35 g. of m-amino-alpha-ethylhydrocinnamic acid, M. P. 67–70° C.

(c) *Beta-(3-amino - 2,4,6 - triiodophenyl)-alpha-ethylpropionic acid.*—A solution of 5.0 g. of m-amino-alpha-ethylhydrocinnamic acid in 100 cc. of water containing 5 cc. of concentrated hydrochloric acid is added over a period of one-half hour to a stirred solution of 3.2 cc. of iodine monochloride in 25 cc. of water and 25 cc. of concentrated hydrochloric acid heated to 60° C. After addition is complete, the heating is continued for one hour longer at 60–70° C. A black oil separates which gradually solidifies. The mixture is then cooled and sodium bisulfite added to decolorize. Recrystallization of the product from methanol gives about 8 g., M. P. 147–150° C. The beta-(3-amino-2,4,6-triiodophenyl)-alpha-ethylpropionic acid may be purified further by precipitation of the morpholine salt from ether solution and regeneration of the free amino acid by treatment of a methanol solution of the morpholine salt with sulfur dioxide. The pure amino acid has the M. P. 155–156.5° C.

Example 8

(a) *Alpha-propyl-p-nitrocinnamic acid* is prepared from p-nitrobenzaldehyde, valeric anhydride, and sodium valerate by the method described in Example 2, part (a), and is obtained in about 39% yield; M. P. about 132–134° C. when recrystallized from dilute ethanol.

(b) *Alpha-propyl-beta - (p - aminophenyl) - propionic acid* is prepared from alpha-propyl-p-nitrocinnamic acid by hydrogenation in the presence of dilute sodium hydroxide solution and Raney nickel catalyst according to the method of Example 1, part (b), and is obtained in about 82% yield; M. P. about 151–153° C. when recrystallized from a dilute methanol.

(c) *Beta-(4-amino - 3,5 - diiodophenyl)-alpha-propylpropionic acid.—*

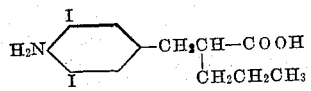

A solution of 26.2 g. of iodine monochloride in 200 ml. of 6 N hydrochloric acid is warmed to 70° C. To the stirred solution there is added over a period of ninety minutes a solution of 16.0 g. of beta-(p-aminophenyl)-alpha-propylpropionic acid in 440 ml. of 0.12 N hydrochloric acid. After one-half hour an oil separates and gradually solidifies. After one hour more at 70° C. the mixture is cooled, diluted with 500 ml. of water and saturated with sulfur dioxide. The product is then filtered and dried. It amounts to about 32 g. and melts at about 111–113° C. It is recrystallized from dilute methanol with practically no change in melting point. The resulting 29.5 g. of beta-(4-amino-3,5-diiodophenyl) - alpha - propylpropionic acid is dissolved in ether and treated with a slight excess of morpholine. The morpholine salt is filtered and recrystallized twice from a benzene-ligroin mixture to give pink plates melting at 130–132° C. These crystals are dissolved in methanol and the solution diluted with water. It is then saturated with sulfur dioxide and further diluted to the point of incipient crystallization. On slow cooling about 19.0 g. of beta-(4-amino-3,5-diiodophenyl)-alphapropylpropionic acid separates, which melts at about 121–122° C.

Example 9

(a) *Alpha-pentyl-p-nitrocinnamic acid* is prepared from p-nitrobenzaldehyde, heptanoic anhydride and sodium heptanoate by the method described in Example 2, part (a), and is obtained in about 37% yield; M. P. about 167–169° C. when recrystallized from ethanol.

(b) *Alpha-pentyl-beta-(p-aminophenyl)-propionic acid* is prepared from alpha-pentyl-p-nitrocinnamic acid by hydrogenation in the presence of dilute sodium hydroxide solution and Raney nickel catalyst according to the method of Example 1, part (b), and is obtained in about 93% yield; M. P. about 140–142° C. when recrystallized from a benzene-ligroin mixture.

(c) *Alpha-pentyl-beta-(4-amino - 3,5 - diiodophenyl)-propionic acid.—*

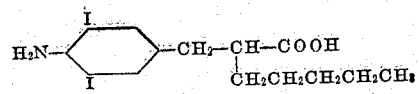

is prepared by iodination of alpha-pentyl-beta-(p-aminophenyl)-propionic acid. When prepared according to the method of Example 8, part (c), it is obtained in about 40% yield and melts at about 104–105.5° C. when recrystallized from a benzene-ligroin mixture.

Its morpholine salt has the M. P. about 117–119° C.

Example 10

(a) *Alpha - (2 - cyclohexylethyl) - p - nitrocinnamic acid* is prepared from p-nitrobenzaldehyde, gamma-cyclohexylbutyric anhydride (B. P. 169–172° C. at 0.5 mm., $n_D^{25}=1.4730$) and sodium gamma-cyclohexylbutyrate by the method described in Example 2, part (a), and is obtained in about 45% yield; M. P. about 170–172° C. when recrystallized from ethanol.

(b) *Alpha - (2 - cyclohexylethyl) - beta - (p - aminophenyl)-propionic acid* is prepared from alpha-(2-cyclohexylethyl)-p-nitrocinnamic acid by hydrogenation in the presence of dilute sodium hydroxide solution and Raney nickel catalyst according to the method of Example 1, part (b), and is obtained in about 95% yield; M. P. about 176–177° C. when recrystallized from ethanol.

(c) *Alpha - (2 - cyclohexylethyl) - beta - (4 - amino - 3,5-diiodophenyl)-propionic acid.—*

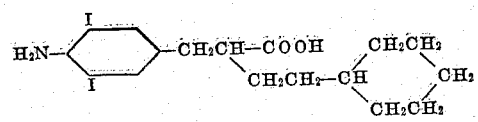

is prepared by iodination of alpha-(2-cyclohexylethyl)-beta-(p-aminophenyl)-propionic acid. When prepared according to the method of Example 8, part (c), it is obtained in about 62% yield and melts at about 123–123.50° C. when recrystallized from dilute ethanol.

Its morpholine salt has the M. P. about 129–133° C.

Example 11

(a) *Alpha - cyclohexylmethyl - p - nitrocinnamic acid* is prepared from p-nitrobenzaldehyde, beta-cyclohexylpropionic anhydride (B. P. 154–158° C. at 0.5 mm., $n_D^{25}=1.4720$) and sodium beta-cyclohexylpropionate by the method described in Example 2, part (a), and is obtained in about 42% yield; M. P. about 195–196.5° C. when recrystallized from ethanol.

(b) *Alpha - cyclohexylmethyl - beta - (p - aminophenyl)-propionic acid* is prepared from alpha-cyclohexylmethyl-p-nitrocinnamic acid by hydrogenation in the presence of dilute sodium hydroxide solution and Raney nickel catalyst according to the method of Example 1, part (b), and is obtained in about 97% yield; M. P. about 176–177° C. when recrystallized from benzene.

(c) *Alpha - cyclohexylmethyl - beta - (4 - amino - 3,5-diiodophenyl)-propionic acid.—*

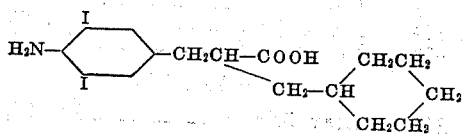

is prepared by hydrogenation of alpha-cyclohexylmethyl-beta-(p-aminophenyl)-propionic acid. When prepared according to the method of Example 2, part (d), it is obtained in about 83% yield and melts at about 142–144° C. when recrystallized from dilute ethanol.

Example 12

(a) *Alpha-isoamyl-p-nitrocinnamic acid* is prepared from p-nitrobenzaldehyde, isoheptanoic anhydride and sodium isoheptonoate by the method described in Example 2, part (a), and is obtained in about 52% yield; M. P. about 163–164° C. when recrystallized from ethanol.

(b) *Alpha - isoamyl - beta - (p - aminophenyl) - propionic acid* is prepared from alpha-isoamyl-p-nitrocinnamic acid by hydrogenation in the presence of dilute sodium hydroxide solution and Raney nickel catalyst according to the method of Example 1, part (b), and is obtained in about 99% yield; M. P. about 161–162.5° C. when recrystallized from dilute ethanol.

(c) *Alpha - isoamyl - beta - (4 - amino - 3,5 - diiodophenyl)-propionc acid.—*

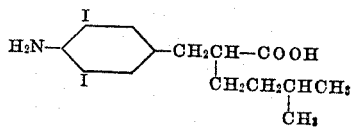

is prepared by hydrogenation of alpha-isoamyl-beta-(p-aminophenyl)-propionic acid. When prepared according to the method of Example 2, part (d), it is obtained in about 20% yield and melts at about 100–102° C. when recrystallized from dilute methanol.

Its morpholine salt has the M. P. about 105–107° C.

Example 13

(a) *Alpha - benzyl - p - nitrocinnamic acid* is prepared from para-nitrobenzaldehyde, beta-phenylpropionic anhydride and sodium beta-phenyl-propionate by the method described in Example 2, part (a), and melts at about 169–170° C. (uncorr.).

(b) *Alpha - benzyl - beta - (p - aminophenyl) - propionic acid* is prepared from alpha-benzyl-p-nitrocinnamic acid by hydrogenation in the presence of dilute sodium hydroxide solution and Raney nickel catalyst according to the method of Example 1, part (b), and melts at about 155–156° C. (uncorr.).

(c) *Alpha - benzyl - beta - (4 - amino - 3,5 - diiodophenyl) - propionic acid.—*

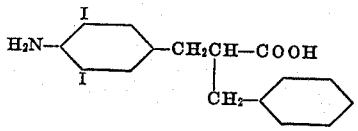

is prepared by iodination of alpha-benzyl-beta-(p-aminophenyl)-propionic acid. It is obtained in the form of a tan crystalline solid, M. P. about 164.5–165° C. (corr.).

This application is a continuation-in-part of my copending application, Ser. No. 770,171, filed August 22, 1947, now abandoned.

I claim:

1. A compound having the formula

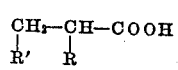

where one of R and R' is a hydrocarbon radical having from 2 to 8 carbon atoms and the other of R and R' is an amino-phenyl radical further substituted by 2–3 iodine atoms distributed among the positions ortho and para to the amino group; and salts thereof.

2. A compound having the formula

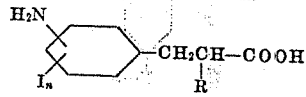

where R is a hydrocarbon radical having from 2 to 8 carbon atoms, n is 2–3 and the iodine atoms are distributed among the positions ortho and para to the amino group; and salts thereof.

3. A compound having the formula

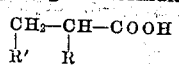

where one of R and R' is a hydrocarbon radical having from 2 to 8 carbon atoms, and the other of R and R' is a 4-amino-3,5-diiodophenyl radical; and salts thereof.

4. A compound having the formula

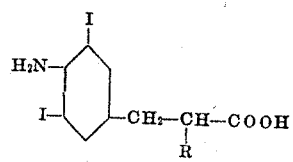

where R is a hydrocarbon radical having from 2 to 8 carbon atoms; and salts thereof.

5. A compound having the formula

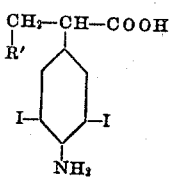

where R' is a hydrocarbon radical having from 2 to 8 carbon atoms; and salts thereof.

6. A compound having the formula

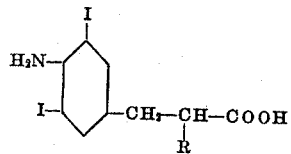

where R is an alkyl radical having from 2 to 8 carbon atoms; and salts thereof.

7. Beta - (3 - amino - 2,4,6-triiodophenyl)-alpha-ethyl-propionic acid.

8. Beta - (4-amino-3,5-diiodophenyl)-alpha-phenylpropionic acid.

9. Alpha - (4-amino-3,5-diiodophenyl)-beta-phenylpropionic acid.

10. A compound having the formula

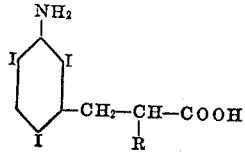

where R is a hydrocarbon radical having from 2 to 8 carbon atoms.

11. A compound having the formula

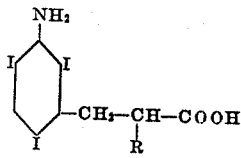

where R is an alkyl radical having from 2 to 8 carbon atoms.

12. Compounds of the formula:

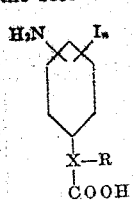

where X is a two carbon hydrocarbon chain, R is a member of the group consisting of ethyl, propyl, butyl and amyl, and $n$ is an integer of 2 to 3.

13. Beta - (4-amino-3,5-diiodophenyl)-alpha-butylpropionic acid.

14. Beta - (4 - amino-3,5-diiodophenyl)-alpha-propylpropionic acid.

References Cited in the file of this patent

UNITED STATES PATENTS

| | | |
|---|---|---|
| 2,135,474 | Sachs | Nov. 1, 1938 |
| 2,160,413 | Dohrn et al. | May 30, 1939 |
| 2,345,384 | Dohrn et al. | Mar. 28, 1944 |
| 2,400,433 | Natelson et al. | May 14, 1946 |

FOREIGN PATENTS

| | | |
|---|---|---|
| 517,382 | Great Britain | July 25, 1938 |

OTHER REFERENCES

Wheeler et al., Am. Chem. J., vol. 43, p. 14 (1910).